US008332108B2

(12) United States Patent
Kresse et al.

(10) Patent No.: US 8,332,108 B2
(45) Date of Patent: Dec. 11, 2012

(54) SYSTEM FOR DETERMINING A VEHICLE MASS-BASED BREAKPOINT FOR SELECTING BETWEEN TWO DIFFERENT TRANSMISSION SHIFT SCHEDULES

(75) Inventors: John Kresse, Martinsville, IN (US); Robert Merrion, Pittsboro, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 581 days.

(21) Appl. No.: 12/455,369

(22) Filed: Jun. 1, 2009

(65) Prior Publication Data
US 2010/0305822 A1 Dec. 2, 2010

(51) Int. Cl.
*F16H 61/02* (2006.01)
*F16H 59/14* (2006.01)
(52) U.S. Cl. ......................................... 701/56; 477/900
(58) Field of Classification Search ................. 701/51, 701/54, 56, 58, 61; 477/120, 900
See application file for complete search history.

(56) References Cited

U.S. PATENT DOCUMENTS

| | | | | |
|---|---|---|---|---|
| 4,625,590 A * | 12/1986 | Muller | | 477/120 |
| 4,630,508 A * | 12/1986 | Klatt | | 701/54 |
| 5,510,982 A * | 4/1996 | Ohnishi et al. | | 701/55 |
| 5,765,117 A * | 6/1998 | Horiguchi | | 701/51 |
| RE39,134 E * | 6/2006 | Ohnishi et al. | | 701/55 |
| RE39,684 E * | 6/2007 | Ohnishi et al. | | 701/55 |
| 7,499,784 B2 * | 3/2009 | Kresse | | 701/61 |
| 7,873,452 B2 * | 1/2011 | Hawkins et al. | | 701/36 |
| 7,966,115 B2 * | 6/2011 | Bellinger | | 701/55 |
| 7,967,724 B2 * | 6/2011 | Kojima et al. | | 477/97 |
| 8,000,877 B2 * | 8/2011 | Aussillou | | 701/103 |
| 2005/0090962 A1 * | 4/2005 | Ota et al. | | 701/51 |
| 2006/0155453 A1 | 7/2006 | Han et al. | | |
| 2008/0249693 A1 | 10/2008 | Kresse | | |

FOREIGN PATENT DOCUMENTS

| | | | | |
|---|---|---|---|---|
| JP | 61079056 A | * | 4/1986 | |
| JP | 62160929 A | * | 7/1987 | |
| JP | 06147304 A | * | 5/1994 | |
| JP | 08074981 A | * | 3/1996 | |
| JP | 2004257434 A | * | 9/2004 | |

OTHER PUBLICATIONS

The International Search Report and the Written Opinion of the International Searching Authority, for PCT/US2010/031049, dated Jun. 16, 2010, (10 pages).

* cited by examiner

*Primary Examiner* — James Trammell
*Assistant Examiner* — David Testardi
(74) *Attorney, Agent, or Firm* — Taft Stettinius & Hollister, LLP; Stephen F. Rost, Esq.

(57) ABSTRACT

A method is provided for selecting between economy mode and performance mode shift schedules for a transmission in a motor vehicle. A desired vehicle acceleration profile is specified, and a cumulative net tractive force of the vehicle is determined over the desired vehicle acceleration profile. A change in vehicle speed over the desired vehicle acceleration profile is also determined. A vehicle mass-based shift schedule breakpoint is computed as a function of the cumulative net tractive force of the vehicle and the change in vehicle speed over the desired vehicle acceleration profile. The vehicle mass-based shift schedule breakpoint is compared to a current vehicle mass indicator, and one of the economy mode and performance mode shift schedules is selected for operation of the transmission based on the comparison. Shifting between gear ranges of the transmission is controlled using the selected one of the economy mode and performance mode shift schedules.

18 Claims, 5 Drawing Sheets

SYSTEM FOR DETERMINING A VEHICLE MASS-BASED BREAKPOINT FOR SELECTING BETWEEN TWO DIFFERENT TRANSMISSION SHIFT SCHEDULES

FIELD OF THE INVENTION

The present invention relates generally to motor vehicle transmissions having a number of automatically selectable gears, and more specifically to systems for determining a vehicle mass-based breakpoint which can be used to select between two different transmission shift schedules as a function of a current vehicle mass indicator.

BACKGROUND

Transmissions having a number of automatically selectable gears are typically controlled by a control circuit according to one or more pre-programmed shift schedules that define transmission shift points between the various gears as a function of engine speed. In some embodiments, the control circuit may have access to two or more different shift schedules that each defines transmission shift points according to different criteria. For example, a so-called economy mode shift point schedule may define transmission shift points at lower engine speeds relative to a so-called performance mode shift schedule such that relatively higher fuel economy is realized with the economy mode schedule and relatively higher engine performance is realized with the performance mode schedule.

One example criteria for selecting between two different shift schedules is vehicle mass such that under relatively lower vehicle mass conditions an economy mode shift schedule may be desirable, whereas a performance mode shift schedule may be desirable under relatively higher vehicle mass conditions. It is desirable to automatically determine a vehicle mass-based breakpoint for use in selecting between two different shift point schedules based on desired performance and on the current vehicle configuration, and to automatically re-determine the vehicle mass-based breakpoint if any one or more of these initial conditions changes.

SUMMARY

The present invention may comprise one or more of the features recited in the attached claims, and/or one or more of the following features and combinations thereof. A method of selecting between economy mode and performance mode shift schedules for a transmission in a motor vehicle may comprise specifying a desired vehicle acceleration profile, determining a cumulative net tractive force of the vehicle over the desired vehicle acceleration profile, determining a change in vehicle speed over the desired vehicle acceleration profile, computing a vehicle mass-based shift schedule breakpoint as a function of the cumulative net tractive force of the vehicle and the change in vehicle speed over the desired vehicle acceleration profile, comparing the vehicle mass-based shift schedule breakpoint to a current vehicle mass indicator, selecting one of the economy mode and performance mode shift schedules for operation of the transmission based on the comparison, and controlling shifting between gear ranges of the transmission according to the selected one of the economy mode and performance mode shift schedules.

Specifying a desired vehicle acceleration profile may comprise specifying a desired minimum vehicle acceleration profile corresponding to a minimum acceleration that the vehicle will exhibit using the economy mode shift schedule, and the vehicle mass-based shift schedule breakpoint may correspond to a maximum vehicle weight that will achieve the desired minimum vehicle acceleration profile using the economy mode shift schedule. Alternatively, specifying a desired vehicle acceleration profile may comprise specifying a desired maximum vehicle acceleration profile corresponding to a maximum acceleration that the vehicle will exhibit using the performance mode shift schedule, and the vehicle mass-based shift schedule breakpoint may correspond to a minimum vehicle weight that will achieve the desired maximum vehicle acceleration profile using the performance mode shift schedule.

Determining a cumulative net tractive force may comprise determining an engine torque curve corresponding to a full accelerator pedal engine torque curve of an engine operatively coupled to the transmission, determining shift points of the one of the economy mode and performance mode shift schedules that corresponds to the desired vehicle acceleration profile, determining gear ratios of all gear ranges of the transmission, determining a rear axle ratio of the vehicle carrying the transmission, determining an aerodynamic drag force function for the vehicle carrying the transmission, determining a rolling resistance for the vehicle carrying the transmission, and computing the cumulative net tractive force of the vehicle as a function of the desired vehicle acceleration profile, the shift points of the one of the economy mode and performance mode shift schedules, the engine torque curve, the gear ratios of the transmission, the rear axle ratio, the aerodynamic drag force and the rolling resistance over the desired vehicle acceleration profile. In one embodiment, determining an engine torque curve may comprise receiving the full accelerator pedal torque curve from an engine control circuit configured to control operation of the engine. Alternatively, determining an engine torque curve may comprise receiving a peak engine output torque value from an engine control circuit configured to control operation of the engine, and processing the peak engine output torque to infer the full accelerator pedal engine torque curve therefrom. Alternatively still, determining an engine torque curve may comprise programming the full accelerator pedal torque curve into a memory unit.

The method may further comprise re-determining the cumulative net tractive force of the vehicle over the desired vehicle acceleration profile and re-computing the vehicle mass-based shift schedule breakpoint if any one or more of the desired vehicle acceleration profile, the engine torque curve, the shift points of the one of the economy mode and performance mode shift schedules, the gear ratios, the rear axle ratio, the aerodynamic drag force function and the rolling resistance changes value.

The method may be stored in a memory unit in the form of instructions that are executable by a transmission control circuit configured to control operation of the transmission.

Selecting one of the economy mode and performance mode shift schedules for operation of the transmission based on the comparison may comprise selecting the economy mode shift schedule if the vehicle mass-based shift schedule breakpoint is greater than the current vehicle mass indicator and otherwise selecting the performance mode shift schedule. The vehicle mass-based shift schedule breakpoint may be represented as a gross vehicle weight breakpoint and the current vehicle mass indicator may be represented as a current vehicle weight indicator.

A system for selecting between economy mode and performance mode transmission shift schedules may comprise a transmission having a number of automatically selectable gear ranges, a transmission control circuit configured to control operation of the transmission, an engine control circuit configured to control operation of an internal combustion engine operatively coupled to the transmission, and a data link established between the engine control circuit and the transmission control circuit. The transmission control circuit may include a memory having the economy mode and performance mode shift schedules stored therein. The memory of the transmission control circuit may further have instructions stored therein that are executable by the transmission control circuit to determine a desired vehicle acceleration profile, determine a cumulative net tractive force of the vehicle over the desired vehicle acceleration profile, determine a change in vehicle speed over the desired vehicle acceleration profile, compute a vehicle mass-based shift schedule breakpoint as a function of the cumulative net tractive force of the vehicle and the change in vehicle speed over the desired vehicle acceleration profile, compare the vehicle mass-based shift schedule breakpoint to a current vehicle mass indicator, select one of the economy mode and performance mode shift schedules for operation of the transmission based on the comparison, and control shifting between gear ranges of the transmission according to the selected one of the economy mode and performance mode shift schedules.

The instructions stored in the memory of the transmission control circuit may include instructions that are executable by the transmission control circuit to determine the cumulative net tractive force of the vehicle over the desired vehicle acceleration profile by determining an engine torque curve corresponding to a full accelerator pedal engine torque curve of the engine, determining shift points of the one of the economy mode and performance mode shift schedules that corresponds to the desired vehicle acceleration profile, determining gear ratios of all gear ranges of the transmission, determining a rear axle ratio of the vehicle carrying the transmission, determining an aerodynamic drag force function for the vehicle carrying the transmission, determining a rolling resistance for the vehicle carrying the transmission, and computing the cumulative net tractive force of the vehicle as a function of the desired vehicle acceleration profile, the shift points of the one of the economy mode and performance mode shift schedules, the engine torque curve, the gear ratios of the transmission, the rear axle ratio, the aerodynamic drag force and the rolling resistance over the desired vehicle acceleration profile.

In one embodiment, the transmission control circuit may be operable to determine the engine torque curve by receiving the full accelerator pedal engine torque curve from the engine control circuit via the data link. Alternatively, the transmission control circuit may be operable to determine the engine torque curve by receiving a peak engine torque value from the engine control circuit via the data link and inferring the full accelerator pedal engine torque curve from the peak engine torque value. Alternatively still, the full accelerator pedal engine torque curve may be stored in the memory of the transmission control circuit, and the transmission control circuit may be operable to determine the engine torque curve by retrieving the full accelerator pedal engine torque curve from the memory of the transmission control circuit.

The instructions stored in the memory of the transmission control circuit may further include instructions that are executable by the transmission control circuit to re-determine the cumulative net tractive force of the vehicle over the desired vehicle acceleration profile and re-compute the vehicle mass-based shift schedule breakpoint if any one or more of the desired vehicle acceleration profile, the engine torque curve, the shift points of the one of the economy mode and performance mode shift schedules, the gear ratios, the rear axle ratio, the aerodynamic drag force function and the rolling resistance changes value.

The instructions stored in the memory of the transmission control circuit may include instructions that are executable by the transmission control circuit to select one of the economy mode and performance mode shift schedules for operation of the transmission based on the comparison by selecting the economy mode shift schedule if the vehicle mass-based shift schedule breakpoint is greater than the current vehicle mass indicator and otherwise selecting the performance mode shift schedule.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
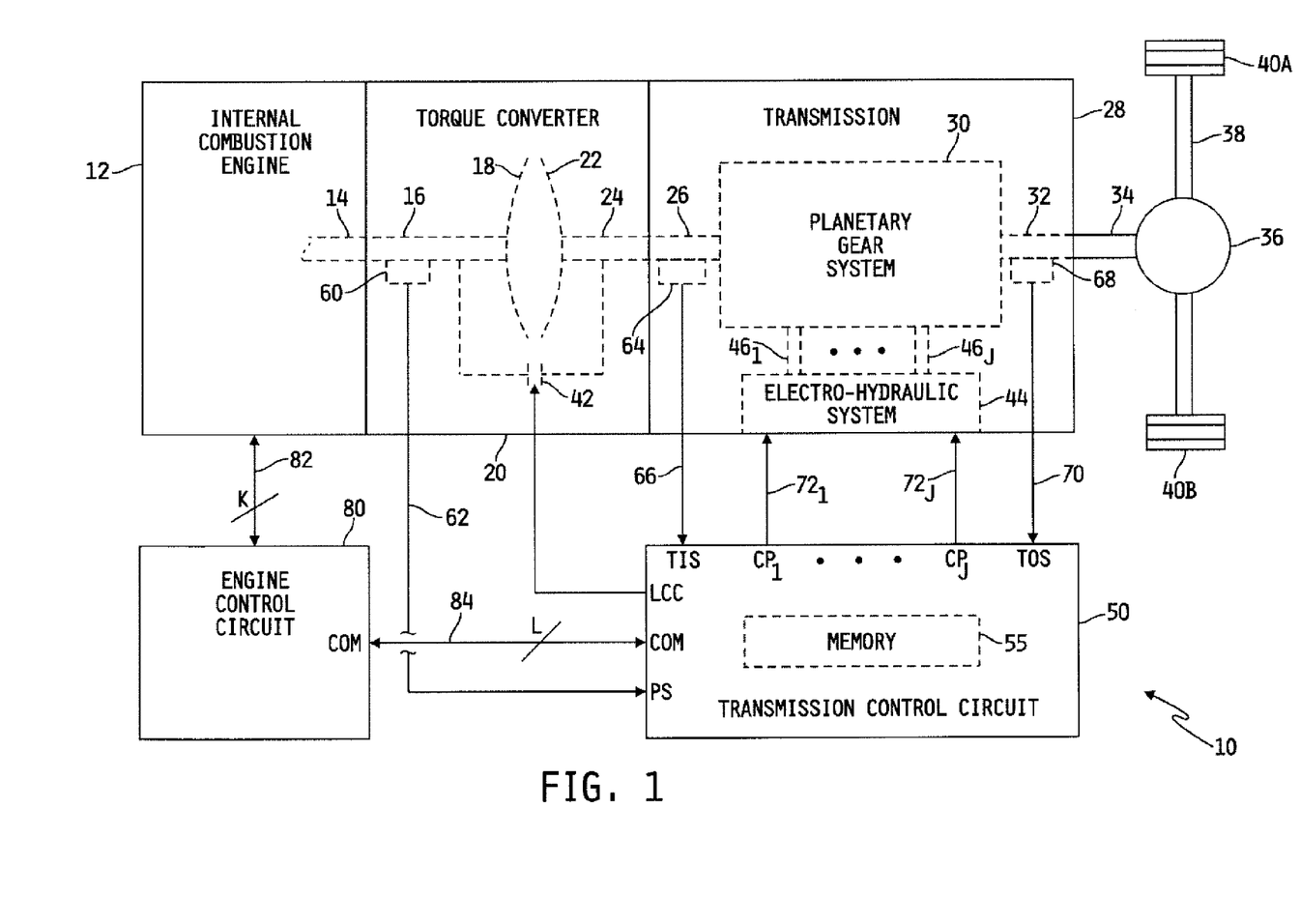
FIG. 1 is a block diagram and schematic view of one illustrative embodiment of a system for determining a vehicle mass-based breakpoint for selecting between two different transmission shift point schedules.

Referring now to FIG. 1, a block diagram and schematic view of one illustrative embodiment of a system 10 for determining a vehicle mass-based breakpoint for selecting between two different transmission shift point schedules is shown. In the illustrated embodiment, the system 10 includes an internal combustion engine 12 that is configured to rotatably drive an output shaft 14 that is coupled to an input or pump shaft 16 of a conventional torque converter 20. The input or pump shaft 16 is attached to an impeller or pump 18 that is rotatably driven by the output shaft 14 of the engine 12. The torque converter 20 further includes a turbine 22 that is attached to a turbine shaft 24, and the turbine shaft 24 is coupled to, or integral with, a rotatable input shaft 26 of a transmission 28. The transmission 28 is conventional and includes, for example, a planetary gear system 30 having a number of automatically selected gears. An output shaft 32 of the transmission is coupled to or integral with, and rotatably drives, a propeller shaft 34 that is coupled to a conventional universal joint 36. The universal joint 36 is coupled to, and rotatably drives, an axle 38 having wheels 40A and 40B mounted thereto at each end. The output shaft 32 of the transmission 28 drives the wheels 40A and 40B in a conventional manner via the propeller shaft 34, universal joint 36 and axle 38.

A conventional lockup clutch 42 is connected between the pump 18 and the turbine 22 of the torque converter 20. The operation of the torque converter 20 is conventional in that the torque converter 20 is operable in a so-called "torque converter" mode during certain operating conditions such as vehicle launch, low speed and certain gear shifting conditions. In the torque converter mode, the lockup clutch 42 is disengaged and the pump 18 rotates at the rotational speed of the engine output shaft 14 while the turbine 22 is rotatably actuated by the pump 18 through a fluid (not shown) interposed between the pump 18 and the turbine 22. In this operational mode, torque multiplication occurs through the fluid coupling such that the turbine shaft 24 is exposed to more drive torque than is being supplied by the engine 12, as is known in the art. The torque converter 20 is alternatively operable in a so-called "lockup" mode during other operating conditions, such as when certain gears of the planetary gear system 30 of the transmission 28 are engaged. In the lockup mode, the lockup clutch 42 is engaged and the pump 18 is thereby secured to directly to the turbine 22 so that the engine output shaft 14 is directly coupled to the input shaft 26 of the transmission 28, as is also known in the art.

The transmission 28 further includes an electro-hydraulic system 44 that is fluidly coupled to the planetary gear system 30 via a number, J, of fluid paths, $46_1$-$46_J$, where J may be any positive integer. The electro-hydraulic system 44 is responsive to control signals to selectively cause fluid to flow through one or more of the fluid paths, $46_1$-$46_J$, to thereby control operation, i.e., engagement and disengagement, of a plurality of corresponding friction devices in the planetary gear system 30. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which should not be considered to be limiting in any way, the plurality of friction devices include a plurality of brake and torque transmitting devices in the form of conventional clutches that may each be controllably engaged and disengaged via fluid pressure supplied by the electro-hydraulic system 36. In any case, changing or shifting between the various gears of the transmission 28 is accomplished in a conventional manner by selectively controlling the plurality of friction devices via control of fluid pressure within the number of fluid paths $46_1$-$46_J$.

The system 10 further includes a transmission control circuit 50 that includes a memory unit 55. The transmission control circuit 50 is illustratively microprocessor-based, and the memory unit 55 generally includes instructions stored therein that are executable by the transmission control circuit 50 to control operation of the torque converter 20 and operation of the transmission 28, i.e., shifting between the various gears of the planetary gear system 30. It will be understood, however, that this disclosure contemplates other embodiments in which the transmission control circuit 50 is not microprocessor-based, but is configured to control operation of the torque converter 20 and/or transmission 28 based on one or more sets of hardwired instructions and/or software instructions stored in the memory unit 55.

In the system 10 illustrated in FIG. 1, the torque converter 20 and the transmission 28 include a number of sensors configured to produce sensor signals that are indicative of one or more operating states of the torque converter 20 and transmission 28 respectively. For example, the torque converter 20 illustratively includes a conventional speed sensor 60 that is positioned and configured to produce a speed signal corresponding to the rotational speed of the pump shaft 16, which is the same rotational speed of the output shaft 14 of the engine 12. The speed sensor 60 is electrically connected to a pump speed input, PS, of the transmission control circuit 50 via a signal path 62, and the transmission control circuit 50 is operable to process the speed signal produced by the speed sensor 60 in a conventional manner to determine the rotational speed of the turbine shaft 16/engine output shaft 14.

The transmission 28 illustratively includes another conventional speed sensor 64 that is positioned and configured to produce a speed signal corresponding to the rotational speed of the transmission input shaft 26, which is the same rotational speed as the turbine shaft 24. The input shaft 26 of the transmission 28 is directly coupled to, or integral with, the turbine shaft 24, and the speed sensor 64 may alternatively be positioned and configured to produce a speed signal corresponding to the rotational speed of the turbine shaft 24. In any case, the speed sensor 64 is electrically connected to a transmission input shaft speed input, TIS, of the transmission control circuit 50 via a signal path 66, and the transmission control circuit 50 is operable to process the speed signal produced by the speed sensor 64 in a conventional manner to determine the rotational speed of the turbine shaft 24/transmission input shaft 26.

The transmission 28 further includes yet another speed sensor 68 that is positioned and configured to produce a speed signal corresponding to the rotational speed of the output shaft 32 of the transmission 28. The speed sensor 68 may be conventional, and is electrically connected to a transmission output shaft speed input, TOS, of the transmission control circuit 50 via a signal path 70. The transmission control circuit 50 is configured to process the speed signal produced by the speed sensor 68 in a conventional manner to determine the rotational speed of the transmission output shaft 32.

In the illustrated embodiment, the transmission 28 further includes one or more actuators configured to control various operations within the transmission 28. For example, the electro-hydraulic system 44 described herein illustratively includes a number of actuators, e.g., conventional solenoids or other conventional actuators, that are electrically connected to a number, J, of control outputs, $CP_1$-$CP_J$, of the transmission control circuit 50 via a corresponding number of signal paths $72_1$-$72_J$, where J may be any positive integer as described above. The actuators within the electro-hydraulic system 44 are each responsive to a corresponding one of the control signals, $CP_1$-$CP_J$, produced by the transmission control circuit 50 on one of the corresponding signal paths $72_1$-$72_J$ to control the friction applied by each of the plurality of friction devices by controlling the pressure of fluid within one or more corresponding fluid passageway $46_1$-$46_J$, and thus control the operation, i.e., engaging and disengaging, of one or more corresponding friction devices, based on information provided by the various speed sensors 60, 64 and/or 68. The friction devices of the planetary gear system 30 are illustratively controlled by hydraulic fluid which is distributed by the electro-hydraulic system in a conventional manner. For example, the electro-hydraulic system 44 illustratively includes a conventional hydraulic positive displacement pump (not shown) which distributes fluid to the one or more friction devices via control of the one or more actuators within the electro-hydraulic system 44. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 50 in accordance with instructions stored in the memory unit 55.

In the illustrated embodiment, the system 10 further includes an engine control circuit 80 having an input/output port (I/O) that is electrically coupled to the engine 12 via a number, K, of signal paths 82, wherein K may be any positive integer. The engine control circuit 80 may be conventional, and is operable to control and manage the overall operation of the engine 12. The engine control circuit 80 further includes a communication port, COM, which is electrically connected to a similar communication port, COM, of the transmission control circuit 50 via a number, L, of signal paths 84, wherein L may be any positive integer. The one or more signal paths 84 are typically referred to collectively as a data link. Generally, the engine control circuit 80 and the transmission control circuit 50 are operable to share information via the one or more signal paths 84 in a conventional manner. In one embodiment, for example, the engine control circuit 80 and transmission control circuit 50 are operable to share information via the one or more signal paths 84 in the form of one or more messages in accordance with a society of automotive engineers (SAE) J-1939 communications protocol, although this disclosure contemplates other embodiments in which the engine control circuit 80 and the transmission control circuit 50 are operable to share information via the one or more signal paths 84 in accordance with one or more other conventional communication protocols.

Figure 2:
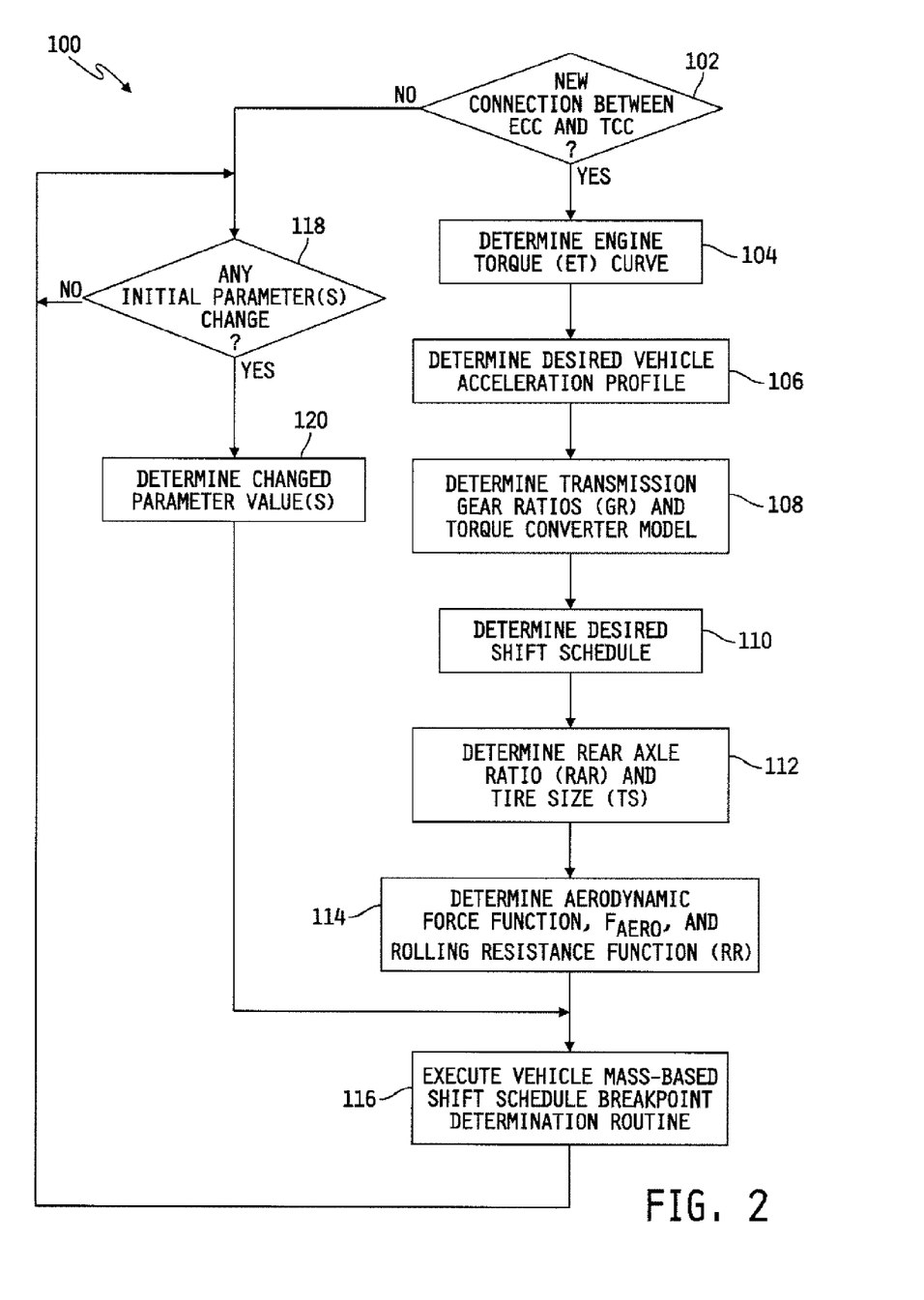
FIG. 2 is a flowchart of one illustrative embodiment of a process for collecting initial engine, transmission, vehicle and desired performance conditions prior to determining the vehicle mass-based breakpoint.

Referring now to FIG. 2, a flowchart is shown of one illustrative embodiment of a process 100 for collecting initial engine, transmission, vehicle and desired performance conditions prior to determining a vehicle mass-based breakpoint. The process 100 is illustratively stored in the memory 55 of the transmission control circuit 50 in the form of instructions that are executable by the transmission control circuit 50 to collect the initial configuration information. The process 100 begins at step 102 where the transmission control circuit 50 determines whether a new electrical connection has been made between the engine control circuit 80 and the transmission control circuit 50. The transmission control circuit 50 and the engine control circuit 80 are typically programmed to exchange certain information when connected for the first time, e.g., during the vehicle build process, and also when a replacement transmission control circuit 50 and/or engine control circuit 80 is installed in the system. When this exchange of information occurs in either case, or when some other conventional indicator of a new connection between the control circuits 50 and 80 is detected, the process 102 advances to step 104 where the transmission control circuit 50 is operable to determine an engine torque curve.

Figure 3:
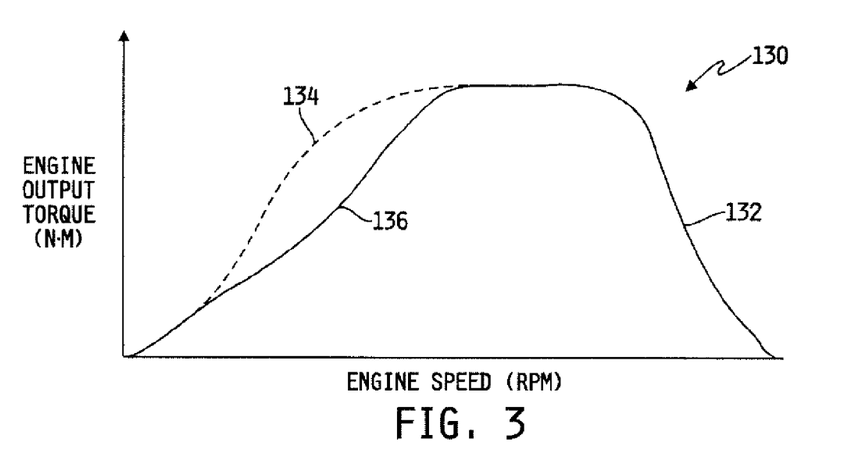
FIG. 3 is a plot of engine output torque vs. engine speed illustrating one example embodiment of an engine torque curve.

Referring to FIG. 3, a plot 130 of engine output torque vs. engine speed is shown illustrating one illustrative example of an engine torque curve. The engine torque curve 130 is typically understood to include the boundary 132 as well as the engine output torque vs. engine speed map contained within the boundary 132. However, for purposes of this disclosure, the term engine torque curve will refer only to the boundary 132, which corresponds to engine output torque vs. engine speed at 100% or maximum accelerator pedal position, i.e., when the accelerator pedal (not shown) of the vehicle is fully depressed, or otherwise known as the full accelerator pedal engine torque curve. While the engine torque curve 132 is typically understood to include the boundary 134 illustrated by dashed-line representation in FIG. 3, a limiting boundary 136 is typically established at low engine speeds for emissions purposes, and the full accelerator pedal engine torque curve referred to hereinafter will be understood to include the boundaries 132 and 136.

Returning again to step 104 of FIG. 2, this disclosure contemplates a number of different techniques for determining the engine torque curve. In one embodiment, for example, the transmission control circuit 50 is operable to determine the engine torque curve by requesting the engine torque curve from the engine control circuit 80. The engine control circuit 80 is, in turn, operable to retrieve the engine torque curve from a memory of the engine control circuit 80, and to then transmit the engine torque curve to the transmission control circuit 50 via the data link 84.

In some alternate embodiments, the engine control circuit 80 may not be configured to supply the entire engine torque curve to the transmission control circuit 50 upon request or otherwise, but may be configured to supply peak engine output torque information only. In such embodiments, the transmission control circuit 50 is operable at step 104 to determine the engine torque curve by requesting the peak engine output torque information from the engine control circuit 80, and the engine control circuit 80 is operable to retrieve the peak engine output torque information from memory and transmit the peak engine output torque information to the transmission control circuit 50 via the data link 84. The transmission control circuit 50 is then operable to construct the engine torque curve in a conventional manner based on the peak engine output torque information received from the engine control circuit 80 and on information otherwise available to or within the transmission control circuit 50.

In other embodiments, the engine control circuit 80 may not be configured to supply any engine output torque information to the transmission control circuit 50 upon request or otherwise. In such embodiments, the engine torque curve is programmed or pre-programmed, in whole or in part, into the memory 55 of the transmission control circuit 50, and the transmission control circuit 50 is operable in this embodiment to determine the engine torque curve at step 104 by retrieving the engine torque curve from the memory 55 and/or by constructing any un-programmed portion of the engine torque curve based on information otherwise available to or within the transmission control circuit 50.

Figure 4A:
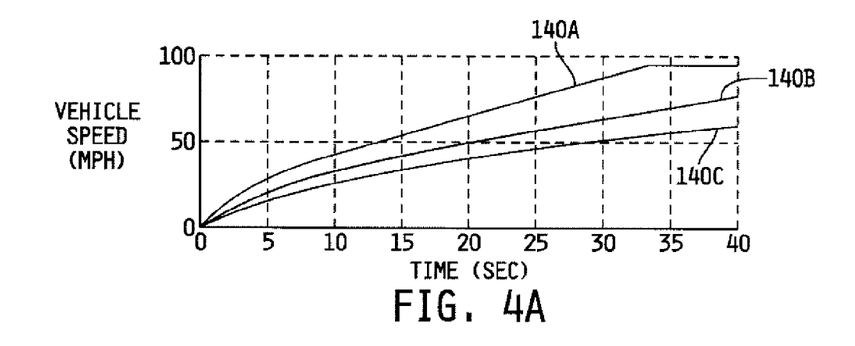
FIG. 4A is a plot of vehicle speed vs. time illustrating a number of selectable, minimum vehicle acceleration profiles for an example economy-mode shift schedule.
Figure 4B:
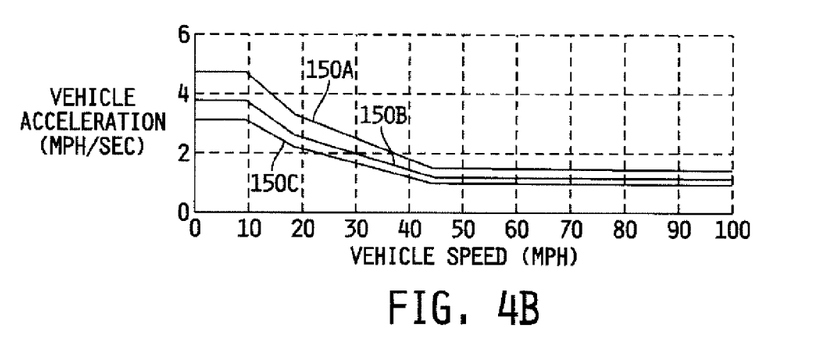
FIG. 4B is a plot of vehicle acceleration vs. vehicle speed illustrating the same profiles shown in FIG. 4A in a different format.

Following step 104, the process 100 of FIG. 2 advances to step 106 where the transmission control circuit 50 is operable to determine a desired vehicle acceleration profile. In one embodiment, a number of pre-existing or pre-programmed vehicle acceleration profiles may be made available, e.g., such as via a conventional service tool or stored within the memory 55 of the transmission control circuit 50, and a desired one of the number of pre-existing or pre-programmed vehicle acceleration profiles may be selected. Referring to FIG. 4A, a plot of vehicle speed vs. time is shown illustrating one example of a selectable number of vehicle acceleration profiles 140A, 140B, 140C, each of which represents a minimum, e.g. worst, acceleration of the vehicle using an economy mode shift schedule. In the illustrated embodiment, the vehicle acceleration profiles 140A, 140B and 140C are each provided in the form of a number, N, of consecutive vehicle speed values, e.g., 1000 values spaced 40 milliseconds apart. Referring to FIG. 4B, a plot of vehicle acceleration vs. vehicle speed is shown illustrating the same information shown in FIG. 4A in a different format. Thus, each of the vehicle acceleration profiles 150A, 150B and 150C corresponds directly to a corresponding one of the vehicle acceleration profiles 140A, 140B and 140C respectively. In any case, step 106 is executed in this embodiment by selecting a desired vehicle acceleration profile from the number of pre-existing or pre-programmed vehicle acceleration profiles. In other embodiments in which no pre-existing or pre-programmed vehicle acceleration profiles are available, a suitable vehicle acceleration profile will be programmed into the memory 55 of the transmission control circuit 50 at step 106.

The process 100 advances from step 106 to step 108 where the transmission control circuit 50 is operable to determine the gear ratios (GR) of each of the selectable gear ranges in the planetary gear system 30 of the transmission 28, and to determine a torque converter model that models operation of the torque converter 20 when operating in torque converter mode as described hereinabove. An N-speed transmission 28 will, for example, have N selectable gear ranges each of which defines a different gear ratio. The torque converter model will illustratively impact the torque ratio between the output shaft 14 of the engine 12 and the output shaft 32 of the transmission 28 in one or more of the numerically low gear ranges of the transmission 28, e.g., in $1^{st}$ and $2^{nd}$ gears, but will generally not impact the torque ratio in the higher gears of the transmission. In any case, the gear ratios of the gear system 30 and the torque converter model will typically be pre-programmed in the memory 55 of the transmission control circuit 50, and the transmission control circuit 50 is thus operable in this embodiment to determine the gear ratio and torque converter model information by retrieving this information from the memory 55. In other embodiments in which this information is not pre-programmed in the memory 55 or otherwise available to the transmission control circuit 50, the gear ratio and torque converter model information is programmed into the memory 55 at step 108.

Following step 108, the process 100 advances to step 110 where the transmission control circuit 50 is operable to determine the desired shift schedule. Generally, the memory 55 of the transmission control circuit 50 will have at least two shift schedules stored therein; a conventional economy mode shift schedule and a conventional performance mode shift schedule as described hereinabove. As is known in the art, the two shift schedules generally differ in the engine speeds or speed ranges at which shifting (up shifting and down shifting) between the various gear ranges of the transmission 28 is accomplished. Depending upon the goal of the vehicle mass-based shift schedule breakpoint determination routine, as will be described in detail hereinafter, and on the selected vehicle acceleration profile, either the economy mode shift schedule or the performance mode shift schedule will be selected at step 110. For example, if the selected vehicle acceleration profile represents a minimum, or worst, acceleration of the vehicle in the economy mode shift schedule, e.g., as illustrated in FIGS. 4A and 4B, then the economy mode shift schedule will be selected at step 110. In contrast, if the selected vehicle acceleration profile represents a maximum acceleration of the vehicle in the performance mode shift schedule, then the performance mode shift schedule will be selected at step 110. In either case, the shift points, i.e., the engine speeds or engine speed ranges at which shifting between the various gear ranges of the transmission 28 are defined, of the shift schedule selected at step 110 are retrieved from the memory 55 of the transmission control circuit 50.

Following step 110, the process 100 advances to step 112 where the transmission control circuit 50 is operable to determine a rear axle ratio (RAR) and tire size (TS) of the vehicle carrying the engine 12 and transmission 28. The rear axle ratio is illustratively a ratio of the number of revolutions of the propeller shaft 34 required to turn the axle 38 one complete revolution, and the tire size is the diameter of the tires 40A and 40B. In some embodiments, the rear axle ratio, RAR, and the tire size, TS, are pre-programmed in the memory 55 of the transmission control circuit 50, and in this embodiment these parameters are simply retrieved from the memory 55 by the transmission control circuit 50 at step 112. In other embodiments, RAR and TS are programmed into the memory 55 at step 112.

Following step 112, the process 100 advances to step 114 where the transmission control circuit 50 is operable to determine an aerodynamic force function, $F_{AERO}$, and a rolling resistance function, RR. The aerodynamic force function illustratively defines an aerodynamic drag force that the vehicle carrying the engine 12 and transmission 28 experiences during operation, and is generally a function of vehicle speed and of the configuration of the vehicle carrying the engine 12 and transmission 28. The rolling resistance function illustratively defines a resistance of the tires 40A and 40B relative to the travel surface during operation of the vehicle. The rolling resistance is generally a function of tire size, although it may be modeled as a constant. In one embodiment, the aerodynamic force function, $F_{AERO}$, is selectable from a number of such functions stored in the memory 55, a memory of the engine control circuit 80 or a conventional service tool. In such embodiments, an appropriate one of the number of aerodynamic force functions is selected at step 114 and stored in the memory 55. In other embodiments, the aerodynamic force function is programmed into the memory 55 at step 114. The rolling resistance may likewise be selectable from a number of rolling resistance functions or values stored in the memory 55, a memory of the engine control circuit 80 or a conventional service tool. In such embodiments, an appropriate one of the number of rolling resistance functions or values is selected at step 114 and stored in the memory 55. In other embodiments, the rolling resistance function or value is programmed into the memory 55 at step 114.

If, at step 102 the transmission control circuit 50 determines that a new connection between the engine control circuit 80 and the transmission control circuit 50 has not been made, the process 100 advances to step 118 where the transmission control circuit 50 is operable to determine whether any one or more of the initial parameters previously collected at steps 104-114 has changed. If so, the transmission control circuit 50 is operable at step 120 to determine the value(s) of the one or more changed parameters. Following either of steps 114 and 120, the process 100 advances to step 116 where the transmission control circuit 50 is operable to execute a vehicle mass-based shift schedule breakpoint determination routine based on the initial parameter information collected at steps 104-114 and/or updated at step 120 of the process 100. Following step 116, and from the "NO" branch of step 118, the process 100 loops back to the beginning of step 118.

Figure 5:
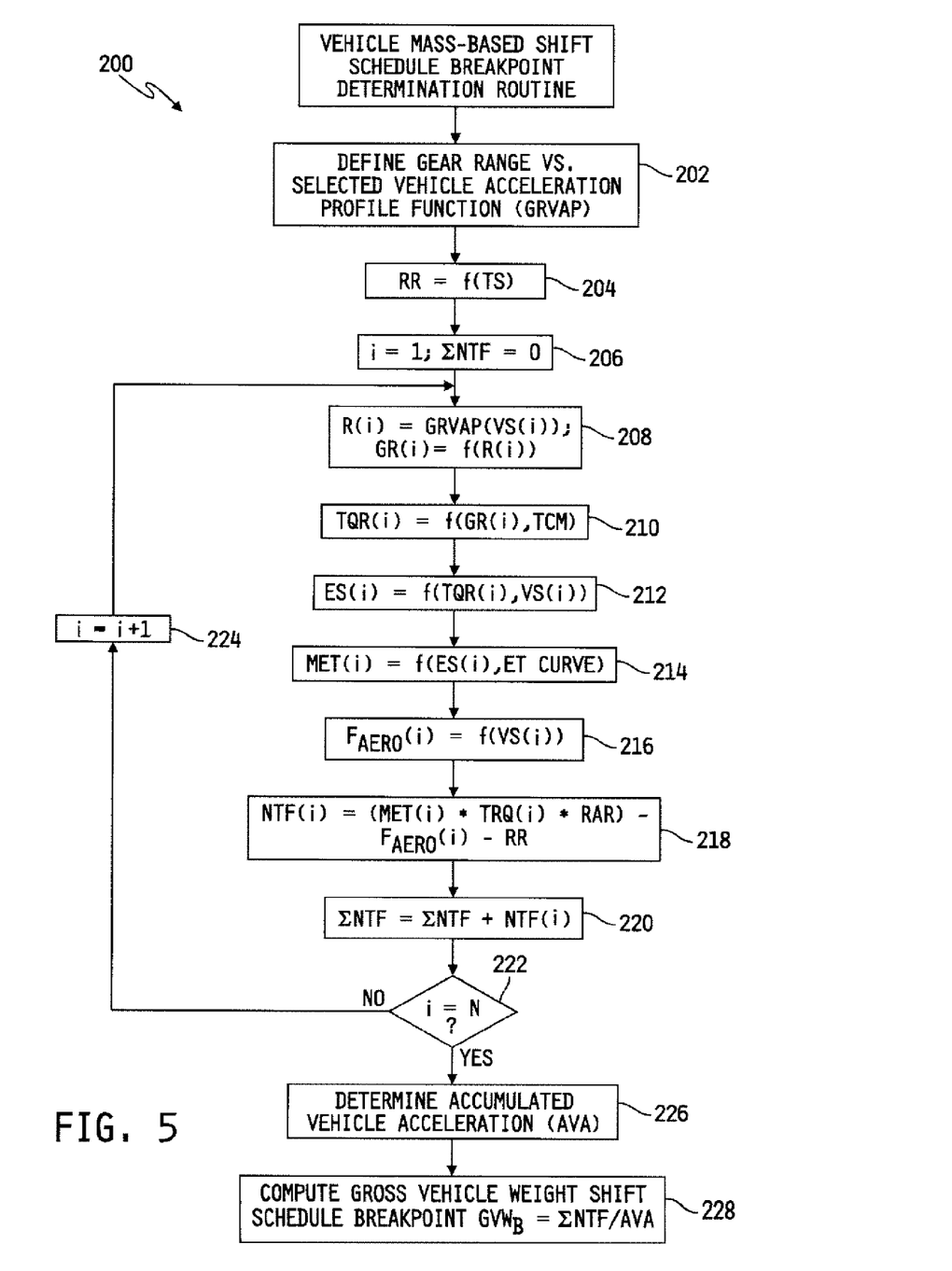
FIG. 5 is a flowchart of one illustrative embodiment of a process for determining a vehicle mass-based breakpoint based on the initial conditions collected according to the process of FIG. 2.

Referring now to FIG. 5, a flowchart is shown of one illustrative embodiment of a process 200 that defines the vehicle mass-based shift schedule breakpoint determination routine of step 116 of the process 100 of FIG. 2. The process 200 is illustratively stored in the memory 55 of the transmission control circuit 50 in the form of instructions that are executable by the transmission control circuit 50 to determine the vehicle mass-based shift schedule breakpoint.

In embodiments of the process 100 in which the desired vehicle acceleration profile selected at step 106 represents a minimum, or worst, acceleration that the vehicle will exhibit using the economy mode shift schedule, and the desired shift schedule selected at step 108 of the process 100 is an economy mode shift schedule, the process 200 is illustratively configured to determine the vehicle mass-based shift schedule breakpoint in the form of a maximum gross vehicle weight that will achieve the selected minimum vehicle acceleration profile using the selected the economy mode shift schedule. This maximum gross vehicle weight that will achieve the selected minimum vehicle acceleration profile with the selected economy mode shift schedule thus represents a gross vehicle weight breakpoint above which the performance mode shift schedule should be used and below (and including) which the economy mode shift schedule should be used. Conversely, in embodiments of the process 100 in which the desired vehicle acceleration profile selected at step 106 represents a maximum, or best, acceleration that the vehicle will exhibit using the performance mode shift schedule, and the desired shift schedule selected at step 108 of the process 100 is a performance mode shift schedule, the process 200 is illustratively configured to determine the vehicle mass-based shift schedule breakpoint in the form of a minimum gross vehicle weight that will achieve the selected maximum vehicle acceleration profile using the selected the performance mode shift schedule. This minimum gross vehicle weight that will achieve the selected maximum vehicle acceleration profile with the selected performance mode shift schedule likewise represents a gross vehicle weight breakpoint above which the performance mode shift schedule should be used and below (and including) which the economy mode shift schedule should be used.

Figure 6:
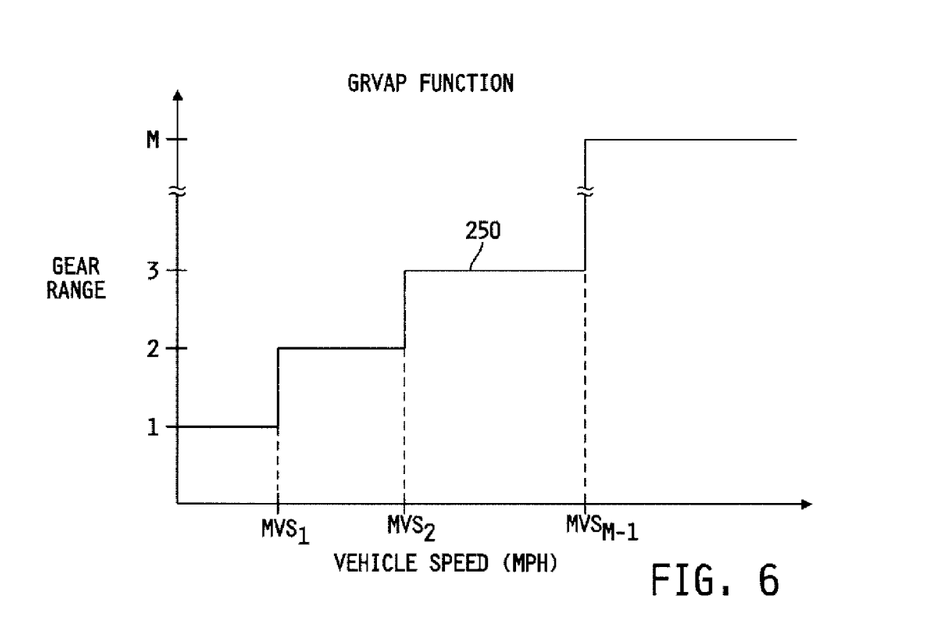
FIG. 6 is a plot of gear range vs. vehicle speed illustrating one example of a map for mapping the selected minimum vehicle acceleration profile to gear range.

The process 200 begins at step 202 where the transmission control circuit 50 is operable to define a gear range vs. selected vehicle acceleration profile function, GRVAP. Illustratively, GRVAP is a map or table that is constructed by the transmission control circuit 50 based on the vehicle acceleration profile selected at step 106 of the process 100 and also based on the shift points of the shift point schedule selected at step 110 of the process 100, and that maps each of the discrete vehicle acceleration profile values to a corresponding one of the transmission gear ranges. Referring now to FIG. 6, a plot 250 of gear range vs. vehicle speed is shown illustrating one example embodiment of a GRVAP function in which the selected vehicle acceleration profile was provided in the form of vehicle speed vs. time, such as shown by example in FIG. 4A. In the embodiment illustrated in FIG. 6, the GRVAP map or function is constructed by mapping each of the N vehicle speed values to a corresponding one of the M different gear ranges using the shift points of the shift schedule selected at step 110 of the process 100, the gear ratio information and torque converter model determined at step 108 of the process 100 and the rear axle ratio, RAR, determined at step 112 of the process 100. For example, the maximum engine speed, $MES_1$, for the $1^{st}$ gear range of the transmission 28 is defined by the corresponding shift point information of the selected shift schedule. This maximum engine speed, $MES_1$, can be converted to a maximum vehicle speed, $MVS_1$, for the $1^{st}$ gear range by multiplying $MES_1$ by a torque ratio defined for the $1^{st}$ gear range by the torque converter model, $TR_1$, by the gear ratio of the $1^{st}$ gear range, $GR_1$, and by the rear axle ratio, RAR, or $MVS_1 = MES_1 * TR_1 * GR_1 * RAR$. All vehicle speed values from the selected vehicle acceleration profile between zero and $MVS_1$ are thus mapped to the first gear range as illustrated in FIG. 6. Likewise, all vehicle speed values from the selected vehicle acceleration profile between $MVS_1$ and $MVS_2$ are mapped to the second gear range, where $MVS_2 = MES_2 * TR_2 * GR_2 * RAR$, and so forth up to $MVS_{M-1}$, and all remaining vehicle speed values are mapped to the Mth gear range as illustrated in FIG. 6. It will be understood, that the torque ratio defined by the torque converter model will typically be unity above a certain gear range, e.g., $3^{rd}$ gear and above and that otherwise the torque converter model torque ratio will generally be a conventional function of vehicle speed or a predetermine torque ratio value. Those skilled in the art will recognize other techniques for mapping the selected vehicle acceleration profile values to corresponding gear ranges, and such other techniques are contemplated by this disclosure.

Referring again to FIG. 5, the process 200 advances from step 202 to step 204 where the transmission control circuit 50 is operable to determine a rolling resistance as a function of the tire size, TS, determined at step 112 of the process 100 of FIG. 2 and illustratively using the rolling resistance function determined at step 114 of the process 100 of FIG. 2. In embodiments of the process 100 in which a rolling resistance value, RR, is determined at step 114 in place of a rolling resistance function, step 204 of the process 200 may be omitted. In any case, the process 200 advances to step 206 where the transmission control circuit 50 is operable to set a cumulative net tractive force accumulator value, ΣNTF, equal to zero, and to set a counter, i, equal to 1. Following step 206, the transmission control circuit 50 is operable to map the ith one of the N values of the selected vehicle acceleration profile to a corresponding gear range, R(i), using the gear range vs. selected vehicle acceleration profile function, GRVAP, defined at step 202 of the process 200. Keeping with the above example in which the selected vehicle acceleration profile is provided in the form of N consecutive vehicle speed value, VS, the transmission control circuit 50 is illustratively operable at step 208 to compute R(i) as a function of VS(i) and GRVAP according to the relationship R(i)=GRVAP(VS(i)) as illustrated by example with respect to FIG. 6. The transmission control circuit 50 is further operable at step 208 to determine the gear ratio of the computed gear range R(i) as a function of R(i), e.g., GR(i)=f(R(i)), using the gear ratio information determined at step 108 of the process 100 of FIG. 2. Thereafter at step 210, the transmission control circuit 50 is operable to compute a transmission torque ratio, TQR(i), as a function of the gear ratio GR(i) determined at step 208 and also as a function of the torque converter model. The torque converter model illustratively produces a torque converter torque ratio, TR, as described above, which is illustratively multiplied by the gear ratio, GR(i), to produce the transmission torque ratio, TQR(i), or TQR(i)=GR(i)*TR. Above a specified gear range, e.g., $3^{rd}$ gear an above, TR is illustratively unity and is otherwise generally a conventional function of vehicle speed or a predetermined torque ratio value. In some embodiments, TQR(i) may also include an inefficiency factor that models efficiency losses through the gear system 30 and the torque converter 20. In such embodiments, such gear system/torque converter inefficiencies can be modeled as a function of gear range and engine speed to produce an inefficiency factor $F_e(i)=f(R(i), ES(i))$ which can be added to, subtracted from or multiplied by the torque ratio, TQR(i), such that the overall torque ratio, TQR(i) is generally reduced by the inefficiency factor. Alternatively or additionally, the gear system/torque converter inefficiencies can be produced in the form of a torque reduction factor that gets subtracted from the tractive force in the cumulative net tractive force equation set forth below.

In any case, following step 210, the transmission control circuit 50 is operable at step 212 to compute engine speed, ES(i) as a conventional function of vehicle speed, VS(i) and the transmission torque ratio, TQR(i) computed at step 212. Thereafter at step 214, the transmission control circuit 50 is operable to determine a maximum engine torque value, MET (i) as a function of engine speed, ES(i) using the engine torque curve determined at step 104 of the process 100 of FIG. 2. Thereafter at step 216, the transmission control circuit 50 is operable to compute an aerodynamic drag force, $F_{AERO}$, as a function of the vehicle speed, VS(i), using the aerodynamic function determined at step 114 of the process 100 of FIG. 2.

Following step 216, the transmission control circuit 50 is operable at step 218 to compute a net tractive force, NTF(i) illustratively according to the relationship NTF(i)=(MET(i)*TRQ(i)*RAR)−$F_{AERO}$(i)−RR. Thereafter at step 218, the transmission control circuit 50 is operable to update the cumulative net tractive force accumulator value, ΣNTF, according to the formula ΣNTF=ΣNTF+NTF(i). Thereafter at step 220, the transmission control circuit 50 is operable to determine whether the counter value, i, is equal to the total number, N, of the selected vehicle acceleration profile values. If not, the process 200 advances to step 224 where the counter, i, is incremented by 1, after which the process 200 loops back to the beginning of step 208.

If, at step 222, the transmission control circuit 50 determines that all N of the selected vehicle acceleration profile values have been processed, the process 200 advances to step 226 where the accumulated vehicle acceleration, AVA, is determined. Again using the example above in which the selected vehicle acceleration profile is provided in the form of N vehicle speed values vs. time beginning with VS(1)=0, the accumulated vehicle acceleration value, AVA, is equal to the maximum vehicle speed achieved in the selected vehicle acceleration profile. In embodiments in which the selected vehicle acceleration profile is otherwise provided in the form of vehicle acceleration data, the accumulated vehicle acceleration value, AVA, will generally be defined as the change in vehicle speed resulting from vehicle acceleration according to the selected vehicle acceleration profile. In any case, the process 200 advances from step 226 to step 228 where the transmission control circuit 50 is operable to compute the gross vehicle weight shift schedule breakpoint, $GVW_B$ as a conventional function of ΣNTF and AVA, e.g., $GVW_B$=ΣNTF/AVA.

Figure 7:
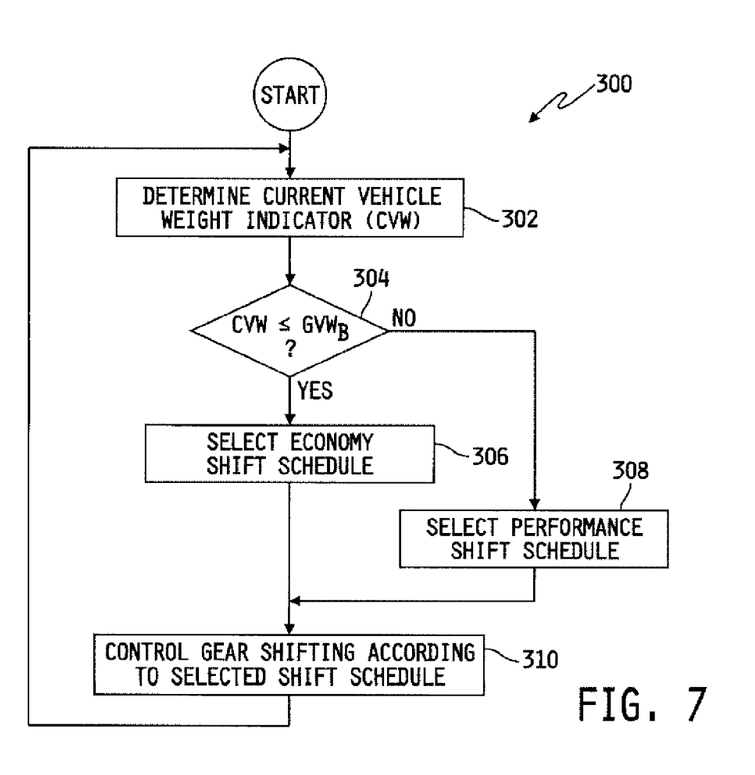
FIG. 7 is a flowchart of one illustrative embodiment of a process for selecting between the economy and performance shift schedules based on a current vehicle mass indicator relative to the vehicle mass-based breakpoint determined according to the process of FIG. 5.

Referring now to FIG. 7, a flowchart is shown of one illustrative embodiment of a process 300 for selecting between the economy mode and performance mode shift schedules based on the vehicle mass-based breakpoint. The process 300 is illustratively stored in the memory 55 of the transmission control circuit in the form of instructions that are executable by the transmission control circuit 50 to select between the economy mode and performance mode shift schedules based on the vehicle mass-based breakpoint. The process 300 begins at step 302 where the transmission control circuit 50 is operable to determine a current vehicle mass or weight indicator, CVW, which is related to the current, total mass or weight of the vehicle carrying the engine 12 and transmission 28. Generally, the term "vehicle" as it is used here will include all components transported by the operation of the engine 12, which may, but need not, include one or more towed components, e.g., trailers and the like. In one embodiment, the current vehicle weight indicator is actual vehicle weight and the memory 55 of the transmission control circuit 50 has instructions stored therein that are executable by the transmission control circuit 50 to estimate the current vehicle weight in a conventional manner, and in this embodiment the transmission control circuit 50 is operable to execute step 302 of the process 300 by determining a current estimate of the weight of the vehicle. In other embodiments, a memory of the engine control circuit 80 has instructions stored therein that are executable by the engine control circuit 80 to estimate the current vehicle weight in a conventional manner, and in this embodiment the transmission control circuit 50 is operable to execute step 302 by receiving the current vehicle weight estimate from the engine control circuit 80, e.g., via the data link 48. In other embodiments, the vehicle may be weighed, and/or the current vehicle weight may be otherwise determined, and the current vehicle weight so determined is programmed into the memory 55 of the transmission control circuit, e.g., via a conventional service tool or via another wired or wireless communication system. In other embodiments, the current vehicle weight indicator, CVW, is not actual vehicle weight but is instead related to current vehicle weight or mass. For example, CVW may illustratively be a pseudo vehicle weight or mass that includes a vehicle mass-like contribution from road grade determinations. Such a pseudo vehicle weight or mass is described in co-pending U.S. Patent Application Publication No. 2008/0249693, filed Oct. 9, 2008, the disclosure of which is incorporated herein by reference. It will be understood that CVW may generally be an actual or estimated current vehicle mass or weight, or may instead be an indicator of vehicle mass or weight that may take into account any one or more of road grade, tractive force, drag force, and/or the like.

In any case, the process 300 advances from step 302 to step 304 where the transmission control circuit 50 is operable to compare the current vehicle weight indicator, CVW, with the gross vehicle weight breakpoint, $GVW_B$. If CVW≦$GVW_B$, the process 300 advances to step 306 where the transmission control circuit 50 selects the economy mode shift schedule. Otherwise, the process 300 advances to step 308 where the transmission control circuit 50 selects the performance mode shift schedule. From either of steps 306 and 308, the process 300 advances to step 310 where the transmission control circuit 50 is operable to control shifting between the various gear ranges of the transmission 28 according to the selected shift schedule.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, this disclosure contemplates embodiments in which a desired vehicle mass may be specified in the process 100 of FIG. 2 in place of a desired shift schedule. The process 200 may then be modified to determine an cumulative net tractive force based on the desired vehicle mass and accumulated vehicle acceleration, and to then decompose the cumulative net tractive force, e.g., using a reverse order of the process steps of the process 200 of FIG. 5 to determine full accelerator pedal shift points of a desired shift schedule. If the selected vehicle acceleration profile corresponds to a minimum acceleration of the vehicle and the specified vehicle mass is a maximum vehicle mass, the full accelerator pedal shift points determined in this embodiment will correspond to full accelerator pedal shift points for an economy shift schedule. Conversely, if the selected vehicle acceleration profile corresponds to a maximum acceleration of the vehicle and the specified vehicle mass corresponds to a minimum vehicle mass, the full accelerator pedal shift points determined in this embodiment will correspond to full accelerator pedal shift points for a performance shift schedule. Modifications to the processes 100 and 200 to accomplish these alternative embodiments would be a mechanical step for a skilled programmer.

What is claimed is:

1. A method of selecting between economy mode and performance mode shift schedules for a transmission in a motor vehicle, the method comprising:
   specifying a desired vehicle acceleration profile,
   determining a cumulative net tractive force of the vehicle over the desired vehicle acceleration profile,
   determining a change in vehicle speed over the desired vehicle acceleration profile,
   computing a vehicle mass-based shift schedule breakpoint as a function of the cumulative net tractive force of the vehicle and the change in vehicle speed over the desired vehicle acceleration profile,
   comparing the vehicle mass-based shift schedule breakpoint to a current vehicle mass indicator,
   selecting one of the economy mode and performance mode shift schedules for operation of the transmission based on the comparison, and
   controlling shifting between gear ranges of the transmission according to the selected one of the economy mode and performance mode shift schedules.

2. The method of claim 1 wherein specifying a desired vehicle acceleration profile comprises specifying a desired minimum vehicle acceleration profile corresponding to a minimum acceleration that the vehicle will exhibit using the economy mode shift schedule, and
   wherein the vehicle mass-based shift schedule breakpoint corresponds to a maximum vehicle weight that will achieve the desired minimum vehicle acceleration profile using the economy mode shift schedule.

3. The method of claim 1 wherein specifying a desired vehicle acceleration profile comprises specifying a desired maximum vehicle acceleration profile corresponding to a maximum acceleration that the vehicle will exhibit using the performance mode shift schedule, and
   wherein the vehicle mass-based shift schedule breakpoint corresponds to a minimum vehicle weight that will achieve the desired maximum vehicle acceleration profile using the performance mode shift schedule.

4. The method of claim 1 wherein determining a cumulative net tractive force comprises:
   determining an engine torque curve corresponding to a full accelerator pedal engine torque curve of an engine operatively coupled to the transmission,
   determining shift points of the one of the economy mode and performance mode shift schedules that corresponds to the desired vehicle acceleration profile,
   determining gear ratios of all gear ranges of the transmission,
   determining a rear axle ratio of the vehicle carrying the transmission,
   determining an aerodynamic drag force function for the vehicle carrying the transmission,
   determining a rolling resistance for the vehicle carrying the transmission, and
   computing the cumulative net tractive force of the vehicle as a function of the desired vehicle acceleration profile, the shift points of the one of the economy mode and performance mode shift schedules, the engine torque curve, the gear ratios of the transmission, the rear axle ratio, the aerodynamic drag force and the rolling resistance over the desired vehicle acceleration profile.

5. The method of claim 4 wherein determining an engine torque curve comprises receiving the full accelerator pedal torque curve from an engine control circuit configured to control operation of the engine.

6. The method of claim 4 wherein determining an engine torque curve comprises: receiving a peak engine output torque value from an engine control circuit configured to control operation of the engine, and processing the peak engine output torque to infer the full accelerator pedal engine torque curve therefrom.

7. The method of claim 4 wherein determining an engine torque curve comprises programming the full accelerator pedal torque curve into a memory unit.

8. The method of claim 4 further comprising re-determining the cumulative net tractive force of the vehicle over the desired vehicle acceleration profile and re-computing the vehicle mass-based shift schedule breakpoint if any one or more of the desired vehicle acceleration profile, the engine torque curve, the shift points of the one of the economy mode and performance mode shift schedules, the gear ratios, the rear axle ratio, the aerodynamic drag force function and the rolling resistance changes value.

9. The method of claim 1 wherein the method is stored in a memory unit in the form of instructions that are executable by a transmission control circuit configured to control operation of the transmission.

10. The method of claim 1 wherein selecting one of the economy mode and performance mode shift schedules for operation of the transmission based on the comparison comprises selecting the economy mode shift schedule if the vehicle mass-based shift schedule breakpoint is greater than the current vehicle mass indicator and otherwise selecting the performance mode shift schedule.

11. The method of claim 10 wherein the vehicle mass-based shift schedule breakpoint is represented as a gross vehicle weight breakpoint and the current vehicle mass indicator is represented as a current vehicle weight indicator.

12. The method of claim 1 wherein the instructions stored in the memory of the transmission control circuit include instructions that are executable by the transmission control circuit to select one of the economy mode and performance mode shift schedules for operation of the transmission based on the comparison by selecting the economy mode shift schedule if the vehicle mass-based shift schedule breakpoint is greater than the current vehicle mass indicator and otherwise selecting the performance mode shift schedule.

13. A system for selecting between economy mode and performance mode transmission shift schedules, comprising:
   a transmission having a number of automatically selectable gear ranges,
   a transmission control circuit configured to control operation of the transmission,
   an engine control circuit configured to control operation of an internal combustion engine operatively coupled to the transmission, and
   a data link established between the engine control circuit and the transmission control circuit,
   wherein the transmission control circuit includes a memory having the economy mode and performance mode shift schedules stored therein, the memory of the transmission control circuit further having instructions stored therein that are executable by the transmission control circuit to determine a desired vehicle acceleration profile, determine a cumulative net tractive force of the vehicle over the desired vehicle acceleration profile, determine a change in vehicle speed over the desired vehicle acceleration profile, compute a vehicle mass-based shift schedule breakpoint as a function of the cumulative net tractive force of the vehicle and the change in vehicle speed over the desired vehicle acceleration profile, compare the vehicle mass-based shift schedule breakpoint to a current vehicle mass indicator, select one of the economy mode and performance mode shift schedules for operation of the transmission based on the comparison, and control shifting between gear ranges of the transmission according to the selected one of the economy mode and performance mode shift schedules.

14. The system of claim 13 wherein the instructions stored in the memory of the transmission control circuit include instructions that are executable by the transmission control circuit to determine the cumulative net tractive force of the vehicle over the desired vehicle acceleration profile by determining an engine torque curve corresponding to a full accelerator pedal engine torque curve of the engine, determining shift points of the one of the economy mode and performance mode shift schedules that corresponds to the desired vehicle acceleration profile, determining gear ratios of all gear ranges of the transmission, determining a rear axle ratio of the vehicle carrying the transmission, determining an aerodynamic drag force function for the vehicle carrying the transmission, determining a rolling resistance for the vehicle carrying the transmission, and computing the cumulative net tractive force of the vehicle as a function of the desired vehicle acceleration profile, the shift points of the one of the economy mode and performance mode shift schedules, the engine torque curve, the gear ratios of the transmission, the rear axle ratio, the aerodynamic drag force and the rolling resistance over the desired vehicle acceleration profile.

15. The system of claim 14 wherein the transmission control circuit is operable to determine the engine torque curve by receiving the full accelerator pedal engine torque curve from the engine control circuit via the data link.

16. The system of claim 14 wherein the transmission control circuit is operable to determine the engine torque curve by receiving a peak engine torque value from the engine control circuit via the data link and inferring the full accelerator pedal engine torque curve from the peak engine torque value.

17. The system of claim 14 wherein the full accelerator pedal engine torque curve is stored in the memory of the transmission control circuit, and wherein the transmission control circuit is operable to determine the engine torque curve by retrieving the full accelerator pedal engine torque curve from the memory of the transmission control circuit.

18. The system of claim 13 wherein the instructions stored in the memory of the transmission control circuit further include instructions that are executable by the transmission control circuit to re-determine the cumulative net tractive force of the vehicle over the desired vehicle acceleration profile and re-compute the vehicle mass-based shift schedule breakpoint if any one or more of the desired vehicle acceleration profile, the engine torque curve, the shift points of the one of the economy mode and performance mode shift schedules, the gear ratios, the rear axle ratio, the aerodynamic drag force function and the rolling resistance changes value.

* * * * *